United States Patent [19]

Stover

[11] Patent Number: 4,531,046

[45] Date of Patent: Jul. 23, 1985

[54] BEVERAGE BREWING APPARATUS WITH CONSTANT TEMPERATURE WATER RESERVOIR

[75] Inventor: Kenneth W. Stover, Springfield, Ill.

[73] Assignee: Bunn-O-Matic Corporation, Springfield, Ill.

[21] Appl. No.: 456,735

[22] Filed: Jan. 10, 1983

[51] Int. Cl.³ .......................... H05B 1/02; F24H 1/20; A47J 31/057

[52] U.S. Cl. ..................................... 219/297; 99/281; 99/288; 99/305; 99/307; 219/306; 219/308; 219/331

[58] Field of Search ................................. 219/296-299, 219/306-308, 283, 331, 328, 523; 99/279-282, 288, 305, 306, 304, 307

[56] References Cited

U.S. PATENT DOCUMENTS

| | | | |
|---|---|---|---|
| 2,876,327 | 3/1959 | Leisey | 219/331 X |
| 3,385,201 | 5/1968 | Martin | 99/284 X |
| 3,523,178 | 8/1970 | Spensley et al. | 219/297 X |
| 3,526,272 | 9/1970 | Watts et al. | 219/331 X |
| 3,678,247 | 7/1972 | Sawa et al. | 219/328 X |
| 3,821,516 | 6/1974 | Hayes et al. | 219/331 X |
| 3,896,289 | 7/1975 | Di Renna | 219/331 X |
| 3,978,778 | 9/1976 | Roberts | 99/305 X |
| 4,413,552 | 11/1983 | Daugherty | 99/295 |

FOREIGN PATENT DOCUMENTS 2051140 4/1972 Fed. Rep. of Germany ...... 219/331

*Primary Examiner*—A. Bartis
*Attorney, Agent, or Firm*—Lockwood, Alex, Fitzgibbon & Cummings

[57] ABSTRACT

A beverage brewing apparatus includes a hot water reservoir from which heated water is dispensed in predetermined serving volumes through a beverage filter to a serving beaker. A volume of cold water equal to a predetermined serving volume is admitted to a lower inlet zone of the reservoir, heated by an electric resistance heating element within the reservoir and dispensed in a volume equal to the serving volume from an upper outlet zone of the reservoir coincident with the introduction of cold water into the inlet zone. The reservoir has a volume greater than twice the predetermined serving volume so that a volume of resident heated water is contained in the central brew zone thereof. A temperature sensing element, e.g., thermistor, is disposed within the lumen of a hollow heat conductive tubing extending to a predetermined location in the brew zone at or near the center of the reservoir and produces a temperature control signal continuously indicative only of the temperature of the water in the brew zone. An electronic control circuit varies the duty cycle of the heating element over recurring timing intervals in response to the control signal to maintain the water in the brew zone at a predetermined temperature. The inlet and outlet zones correspond to the lower one-fourth and the upper one-fourth volumes, respectively, of the reservoir.

4 Claims, 8 Drawing Figures

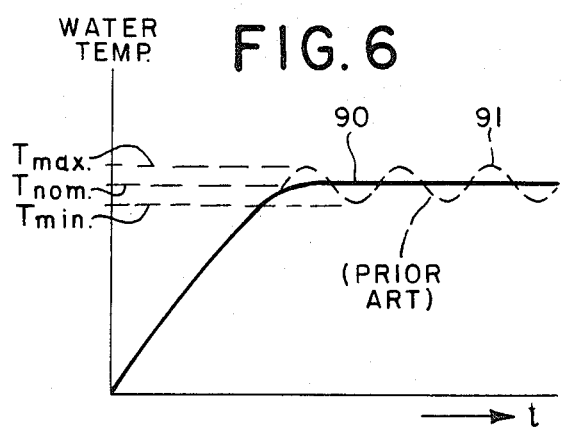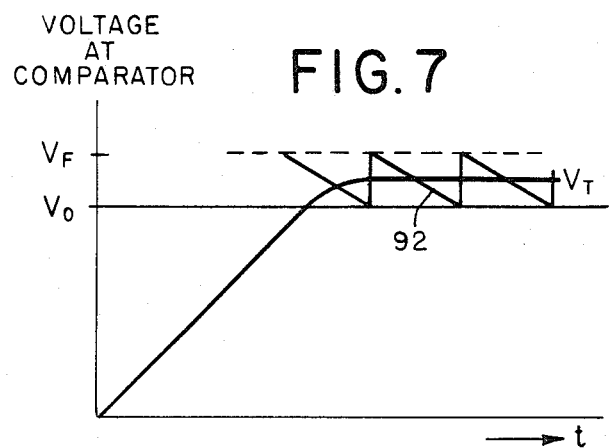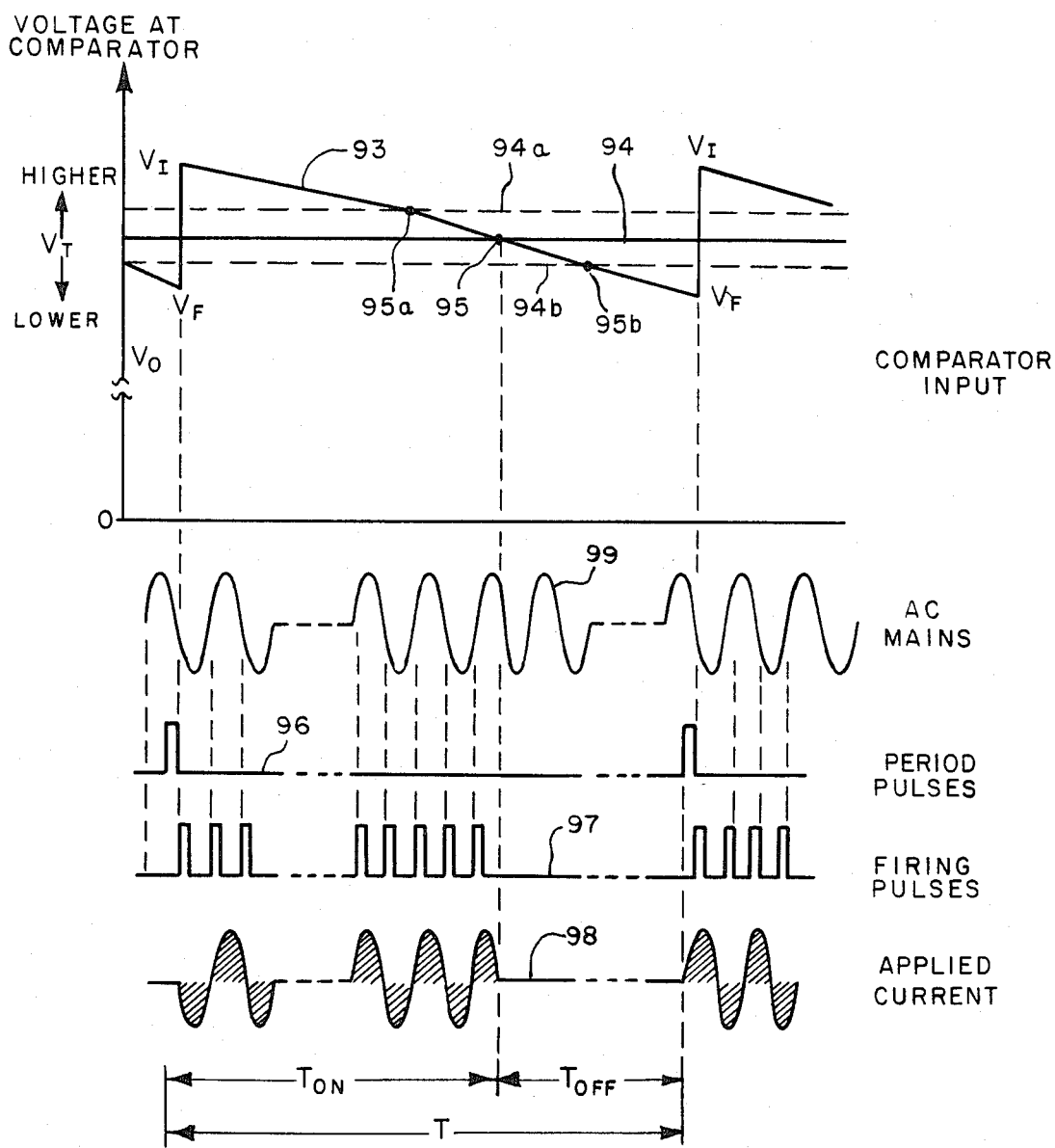
FIG. 8

BEVERAGE BREWING APPARATUS WITH CONSTANT TEMPERATURE WATER RESERVOIR

BACKGROUND OF THE INVENTION

The present invention is directed generally to brewing apparatus for heated beverages, such as coffee and tea, and more particularly to brewing apparatus wherein a supply of hot water for producing the beverage is maintained at a predetermined constant brewing temperature within a heated reservoir by circuitry continuously responsive to the temperature of the contents.

One known type of brewing apparatus for making heated beverages includes a reservoir within which a volume of water to be displaced is heated by a resistance heating element to a predetermined brewing temperature. In a preferred form of such brewing apparatus, such as the coffee maker described in U.S. Pat. No. 4,413,552 to Donald L. Daugherty, heated water is displaced from the top portion, or outlet zone, of the reservoir by cool or cold water entering the bottom portion, or inlet zone, and discharged onto ground coffee or tea held in a brewer funnel lined with a disposable filter. The freshly brewed coffee or tea discharging from the brewer funnel is collected in a serving beaker.

Cold water is admitted in batches of predetermined volumes to the reservoir of such brewing apparatus to displace the heated water delivered to the brewing funnel. In pour-in type beverage brewers, such as described in the afore-identified U.S. Pat. No. 4,413,552, a quantity of cold water sufficient to produce the desired volume of beverage to be brewed is poured into a cold water basin from which it flows by gravity into a hot water tank to displace an equal quantity of hot water to the brewing funnel. In automatic type beverage brewers, such as described in U.S. Pat. No. 3,793,934, a valve is opened by electrical or manual means to periodically deliver the batches of cool or cold water to the apparatus.

Prior art beverage brewers, such as described in U.S. Pat. No. 3,736,155, have employed a bimetallic switch which energized the resistance heating element when the water temperature in the reservoir fell to a predetermined minimum below the brewing temperature, and de-energized the heating element when the water temperature in the reservoir rose to a predetermined maximum above the brewing temperature. The difference between such minimum and maximum temperatures was typically from 6 to 8 degrees Fahrenheit. In this way, water in the hot water tank was cycled between minimum and maximum temperatures, through an average temperature corresponding to the desired brewing temperature. Thermostat switches responsive to temperatures sensed by bulb and capillary type temperature sensing elements disposed in the hot water tanks have also been used. To minimize the frequency of such cycling between minimum and maximum hot water temperatures, an auxiliary heat source in the form of a continuously-excited resistance heating blanket was wrapped around the reservoir to provide a continuous source of heat for the water contained within the reservoir.

For maximum operating efficiency and minimum scale formation within the reservoir, it is desirable that the spread between minimum and maximum hot water temperatures be minimized and preferably substantially eliminated. The present invention is directed to an improved beverage maker of the type maintaining a supply of hot water wherein the heating element in the hot water reservoir is periodically excited over a variable duty cycle to maintain a substantially constant water temperature in the reservoir, thereby minimizing scaling, maximizing operating efficiency and eliminating the need for a heated jacket.

Accordingly, it is a general object of the present invention to provide a new and improved beverage brewer.

It is a more specific object of the present invention to provide a new and improved beverage brewer having improved operating efficiency and reduced tendency for scale formation.

It is a further object of the present invention to provide a new and improved beverage brewer of the type having an internal reservoir for maintaining a supply of heated water wherein the temperature of the water is maintained at a substantially constant predetermined brewing temperature.

Still another object of the invention is the provision of a new and improved beverage brewer of the type housing a hot water tank from which hot water is displaced to a brewing funnel and wherein the water temperature is maintained substantially constant so as to eliminate the need to provide the tank with a heated jacket and thereby avoiding the detrimental effects of such blankets, manifested in corrosion and cracking of the tank wall.

It is a still further object of the present invention to provide a new and improved beverage brewer of the type having an internal hot water reservoir wherein a heating element in the reservoir is periodically excited over a variable duty cycle to maintain a substantially constant predetermined brewing temperature.

SUMMARY OF THE INVENTION

A beverage brewing apparatus includes a hot water reservoir of predetermined volume, and means including a resistance heating element within the reservoir operable from an applied electric current for heating water in the reservoir. Inlet means admit a volume of cold water equal to a predetermined serving volume into an inlet zone at the bottom of the reservoir, and outlet means discharge a volume of heated water equal to the predetermined serving volume from an outlet zone at the top of the reservoir coincident with the introduction of water by the inlet means into the reservoir. The reservoir has a volume substantially greater than twice the predetermined serving volume whereby a volume of resident heated water is contained within a central brew zone thereof. A segment of hollow heat-conductive tubing extends from a location exterior to the reservoir to a predetermined location in the brew zone. Temperature sensing means disposed within the lumen of the tubing segment in thermal communication with the tubing segment at the predetermined location produce a temperature control signal continuously indicative only of the temperature of the water in the brew zone, and substantially non-indicative of the temperature of the water in the inlet and outlet zones, and control circuit means responsive to this control signal vary the duty cycle of the heating element over recurring timing intervals to maintain the water in the brew zone at a substantially constant predetermined temperature.

BRIEF DESCRIPTION OF THE INVENTION

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 6 is a depiction of reservoir water temperature as a function of time useful in understanding the operation of the coffee brewer.

FIG. 7 is a depiction of certain waveforms useful in understanding the operation of the brewer.

FIG. 8 is a depiction of certain waveforms useful in understanding the operation of the heater control circuit of the coffee brewer.

DESCRIPTION OF THE PREFERRED EMBODIMENT

Figure 1:
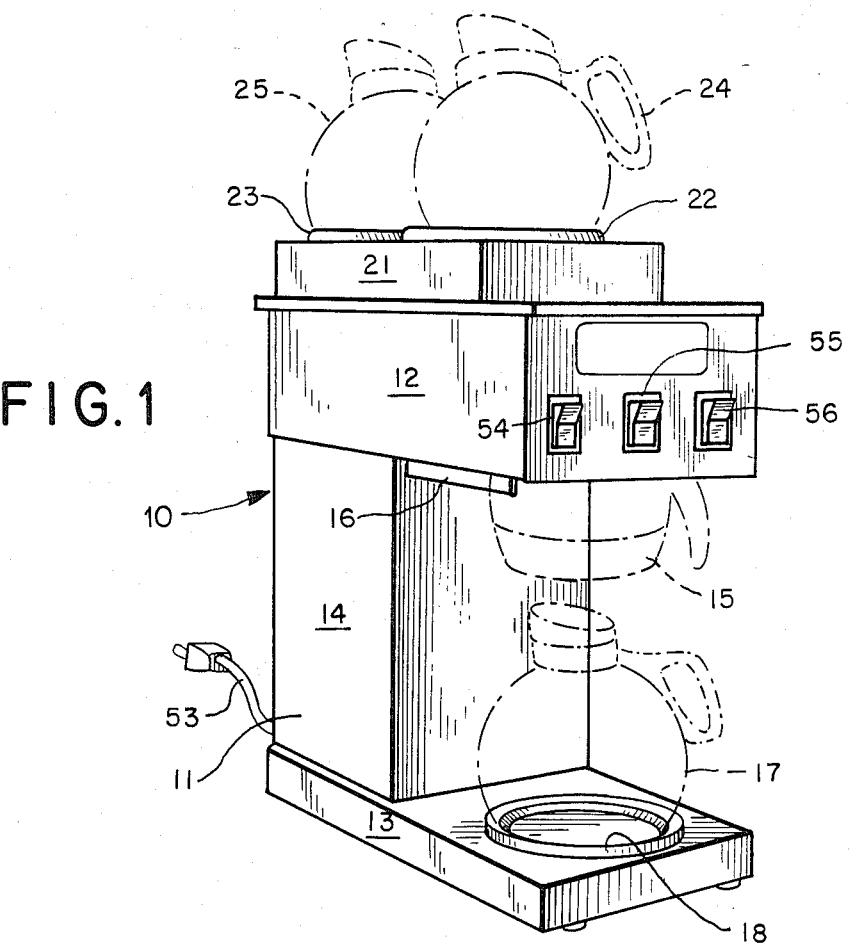
FIG. 1 is a perspective view of a cold water pour-in type coffee brewer forming one embodiment of the present invention shown in conjunction with three coffee beakers and a removable brewer funnel in broken outline.

Referring to the figures, and particularly to FIG. 1, a cold water pour-in coffee maker 10 incorporating the invention is seen to have a generally C-shaped body 11 which includes an upper body portion 12, a lower body portion 13, and an interconnecting upright body portion 14. The coffee maker body 11 is fabricated in a conventional manner, preferably from stainless steel sheet, but may be fabricated from other metals or from known plastics having suitable strength and durability. A brewer funnel 15 of conventional construction is removably supported in a conventional manner by guide rails 16 underneath the upper body portion 12. A coffee serving beaker 17 is removably supported on the bottom body portion 13 underneath the brewer funnel 15 on a heated warming plate 18 mounted on the top surface of the lower body portion 13.

A cold water pour-in opening 20 (FIG. 2) is located on the top front portion of the upper body portion 12. Rearwardly thereof, a top warmer unit 21 is mounted which includes a pair of warming plates 22 and 23 on which two additional serving beakers 24 and 25 may be mounted.

Figure 4:
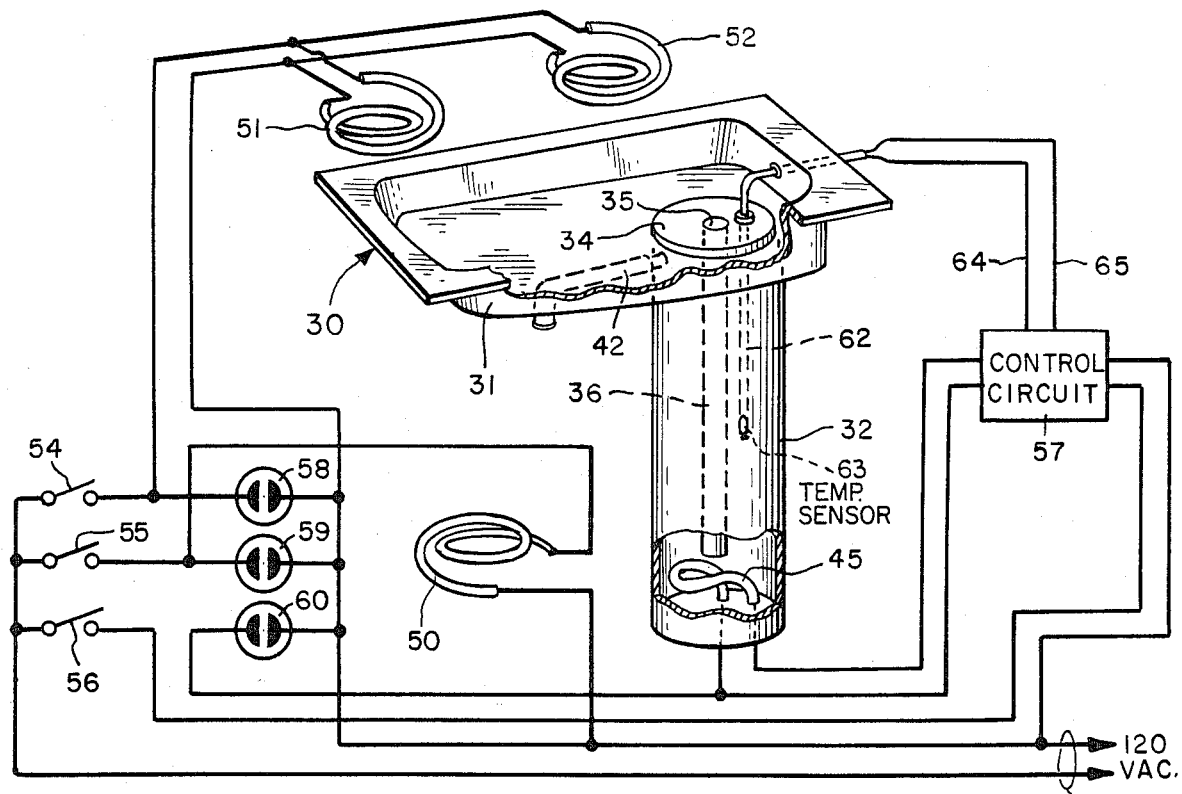
FIG. 4 is a simplified perspective view of certain principal elements of the coffee brewer and the electrical circuitry associated therewith.
Figures 2, 3:
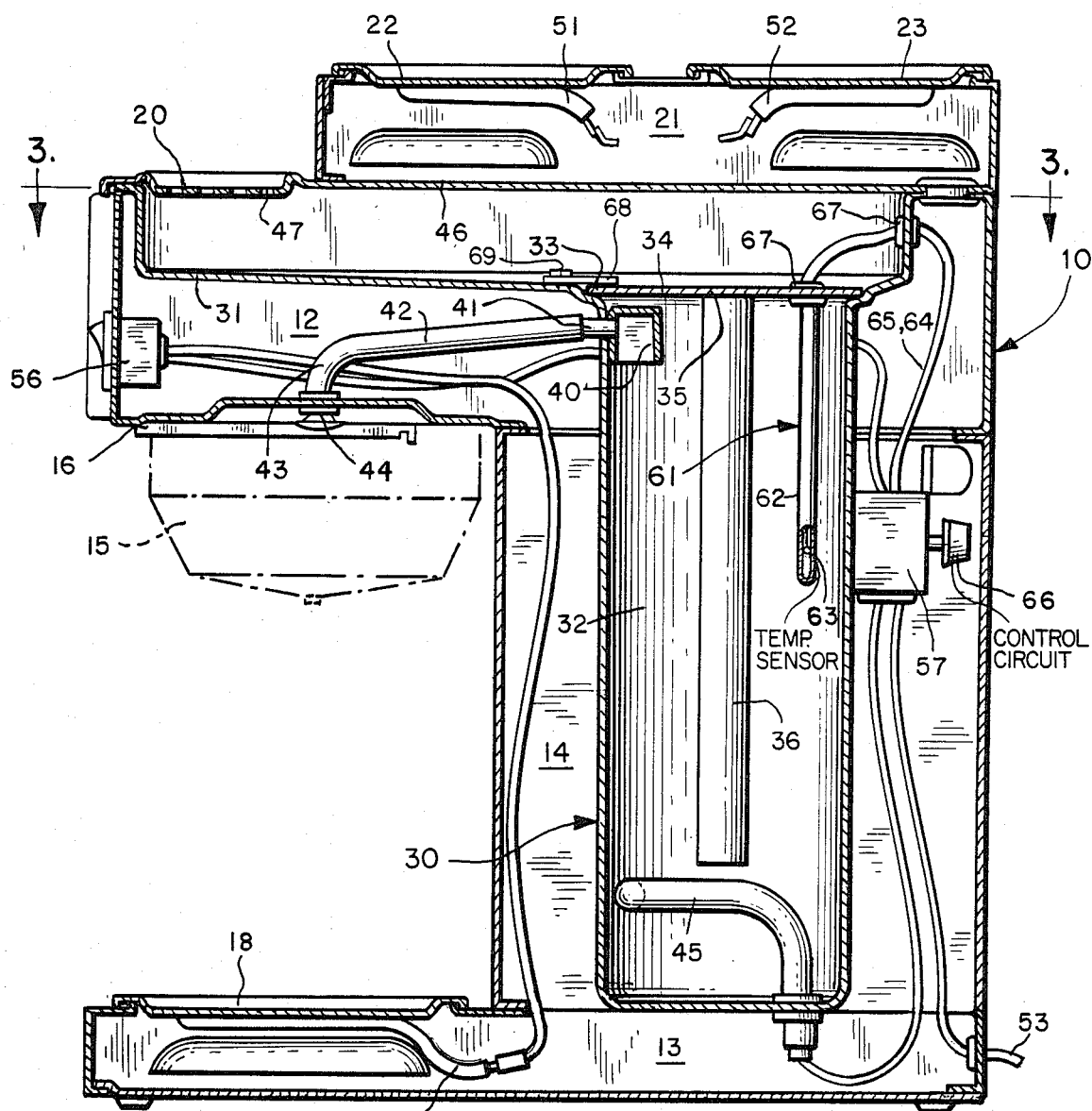
FIG. 2 is a vertical sectional view of the coffee brewer of FIG. 1, certain parts therein being shown in elevation for clarity.
FIG. 3 is a partial top plan view of the coffee brewer taken along line 3—3 of FIG. 2.

The upper body portion 12 and the central vertical body portion 14 house an integral, inverted L-shaped combination elongated cold water basin and hot water reservoir assembly indicated generally at 30 in FIGS. 2-4. The elongated cold water basin 31 of the assembly is preferably die-pressed in a conventional manner from stainless steel sheet so as to have a continuous seamless bottom of progressively increasing depth toward the rear of the coffee brewer. The hot water reservoir 32 of the assembly is welded to a bottom opening 33 (FIG. 2) formed adjacent the deep end of the basin 31. The reservoir 32 is also preferably fabricated from stainless steel sheet in a conventional manner. As best seen in FIG. 2, the bottom of the basin 31 slopes toward recess 33 so that cold water poured into basin 31 will flow and drain into reservoir 32.

In a coffee brewer capable of making two quart batches of coffee, the hot water reservoir 32 may have, by way of illustrative example, an inside diameter of 275 cubic inches (i.e. slightly over two fluid quarts). The capacity of the basin 31 for use with a hot water reservoir 32 of such capacity may, for example, be 155 cubic inches with the interior of the basin having a length of 15¼ inches, a width of 6¼ inches and a depth ranging from 1¾ inches to 1½ inches.

The circular opening communicating between the bottom of basin 31 and the top of hot water reservoir 32 is closed by a disk-shaped baffle 34. A central opening 35 is provided in the disk 34 which communicates with the upper end of a vertical cold water tube 36, the upper end of which is welded or otherwise suitably joined to the underside of disk 34. The bottom end of the cold water tube 36 terminates adjacent the bottom of reservoir 32 so that as cold water flows downwardly through tube 36 it is discharged in the lower portion of reservoir 32, thereby displacing upwardly the hot water contained in the reservoir. This manner of operation is well known in connection with coffee brewers of the cold water pour-in type.

An inverted siphon cup 40 (FIG. 2) is positioned adjacent the top of reservoir 32 near the removable brewer funnel 15. The siphon cup 40 is carried by the inner end of a nipple 41 which projects in fluid-tight relationship through an aperture in the wall of reservoir 32. The outer end of the nipple 41 connects with a downwardly slanted tube 42 having a down-turned outer or distal end 43 on the lower end of which a hot water spray head 44 is fastened in a conventional manner.

Water within reservoir 32 is heated in a conventional manner by a heating element 45, which may take the form of a Calrod resistance heating element or other known electrically energized heating element. The top of basin 31 is covered and enclosed by a cover member 46 (FIG. 2) which forms the top of the upper body portion 12. The cold water pour-in opening 20 is formed in the cover 46 adjacent the front of the coffee maker and preferably is provided with a screen 47 so as to prevent foreign objects from entering the enclosed basin 31. The cover 46 completely encloses the cold water basin 31 and serves as a floor support for the top heater unit 21.

Referring to FIG. 4, electrical power is supplied to three resistance heating elements 50, 51 and 52 associated with hot plate assemblies 18, 22 and 23, respectively, and to the resistance heating unit 45 contained within reservoir 32, by electrical circuitry within housing 11. Electrical power is supplied to this circuitry by a conventional line cord 53. A first electrical switch 54 on the front surface of housing portion 12 controls the application of power to the two resistance heater elements 51 and 52 associated with the top hot plates 22 and 23. A second electrical switch 55 controls the application of electrical power to resistance heating element 50 associated with the bottom hot plate 18. A third electrical switch 56 controls the application of electrical power to a control circuit 57, which in turn controls electrical excitation of the resistance heating element 45 in hot water reservoir 32. Visual indication of the operation of the various resistance heaters is provided by neon-type indicator lamps 58, 59 and 60, which may be incorporated integrally within switches 54–56 to illuminate upon actuation of the respective circuits.

One side of the A/C line is connected to one terminal of each of switches 54–56. Upon closure of switch 54, power is applied to resistance heating elements 51 and 52 and indicator lamp 58. This causes the hot plates 22 and 23 to heat, and coffee placed on these plates as in beakers 24 and 25 to be kept warm for serving. Upon closure of switch 55, resistance heating element 50 and indicator lamp 59 are energized. This causes the bottom hot plate 18 to heat coffee contained in serving beaker 16. Closure of switch 56 causes control circuit 57 to be energized. This control circuit works in conjunction with a temperature probe 61 within reservoir 32 to control the excitation of heating element 45 to heat water in the reservoir to a uniform predetermined serving temperature.

As best seen in FIG. 2, the temperature probe 61 consists of a semi-flexible tubing segment 62 which extends through cover 35 downwardly into and near the generally central portion of reservoir 32. An upper portion of this tubing segment 62 is directed at a generally right angle through the rear side wall of basin 31 through an aperture provided for that purpose. The tubing segment 62, which is preferably formed of a heat-conductive metal such as copper, is closed at its bottom end and extends through plate 34 and the rear wall of basin 31. To sense temperature within the reservoir, a thermistor 63 (FIG. 2) is positioned near the tubing end. A pair of electrical conductors 64 and 65 extend from the thermistor through tubing segment 62 to control circuit 57.

The tubing segment 62 affords protection to thermistor 63 against exposure to liquid within reservoir 32 or basin 31. In addition, the semi-rigidity of tubing segment 62 allows thermistor 63 to be accurately positioned near the central portion of reservoir 32. Adjustment of the exact position may be conveniently accomplished by manually deforming the tubing segment 62 until the thermistor 63 has been properly positioned. In practice, where cold water is admitted to the bottom ¼ portion, or inlet zone, of the reservoir, and heated water is withdrawn from the top ¼ portion, or outlet zone, of the reservoir, it has been found that thermistor 63 is preferably disposed at or near the center, or brew zone, of the reservoir so as to optimize its response to water changes.

A temperature adjustment control 66 (FIG. 2) may be provided in conjunction with control circuit 57 to enable the user to select a desired brewing temperature at which the water within reservoir 32 is to be maintained. A pair of grommets 67 may be provided to protect the tubing segment 67 from possible damage as a result of direct contact with cover plate 34 or the rear wall of basin 31 as it passes through the apertures provided in these elements. A plurality of retaining clips 68 secured to the bottom of basin 31 by screws 69 or other appropriate means may be provided to secure cover 34 in position and prevent inadvertent repositioning of thermistor 63 within hot water reservoir 32.

The operation of coffee brewer 10 will be readily understood since it generally parallels the operation of known cold water pour-in coffee brewers. In putting brewer 10 into operation, sufficient cold water is poured into basin 31 so as to completely fill hot water reservoir 32. The fact that reservoir 32 is filled will be known when water commences to flow out through the side tube 42 and discharge through the spray head 44. When the hot water reservoir is filled, heating element 45 is energized and, thereafter, heating elements 50, 51 and 52 are energized as needed. Once the cold water contents of reservoir 32 have had an opportunity to come to the desired serving temperature, a filter with the proper amount of ground coffee (or tea) may be placed in the brewer funnel 15 and inserted into place on the underside of the top body portion 12 so as to be supported beneath spray head 44 on the rails 16 mounted on the underside of body portion 12.

Assuming that a two quart batch of coffee is to be brewed, a pitcher containing two quarts of cold water is dumped into basin 31 through opening 20. The cold water flows downwardly through cold water tube 36 at a sufficiently rapid rate so that basin 31 will not overflow, even with fast dumping of the two quarts of cold water through the opening. The entrance of the cold water into the bottom portion of the hot water reservoir 32 is at such a restrained rate that it does not mix to a substantial extent with the hot water in the reservoir, but rather, the incoming cold water displaces the hot water upwardly so that it flows out through side tube 42. Once this flow has started, it continues due to siphoning action until the water level in reservoir 32 drops below and exposes the bottom of the inverted siphon cup 40. In a manner well known to the art, hot water sprays from the spray head 44 onto the ground coffee (or tea) in the brewing funnel 15, and the coffee beverage forms in the funnel and discharges through the bottom opening of funnel 15 into serving beaker 17.

It will be appreciated that up to three batches or beakers of coffee may be prepared and maintained at one time on coffee brewer 10 by using the three hot plates 18, 22 and 23. It will also be appreciated that the interior of the hot water reservoir 32 can be readily reached for cleaning by simply removing cover 46 and lifting the cover together with heater unit 21 and temperature probe 61 from the upper body portion 12. Since periodic cleaning or servicing of the interior of the reservoir is normally required, this ready access is a highly desirable feature. Furthermore, the inverted L-shaped configuration of the cold water basin 31 and the hot water reservoir 32 allows the coffee brewer 10 to have a relatively narrow profile from left to right so that it takes up only a small space from one side to the other on a countertop or table. Generally, counter space is at a premium and often limited or restricted, so that this narrow configuration is highly desirable.

Coffee brewer 10 includes, in accordance with the invention, a novel system for maintaining water in reservoir 32 at a preselected temperature for brewing. As shown in FIG. 4, this system includes thermistor 63, heating element 45, and control circuit 57. As previously described, control circuit 57 functions in response to a control signal developed by thermistor 63 to vary the electrical excitation of heating element 45 so as to maintain a uniform water temperature.

Figure 5:
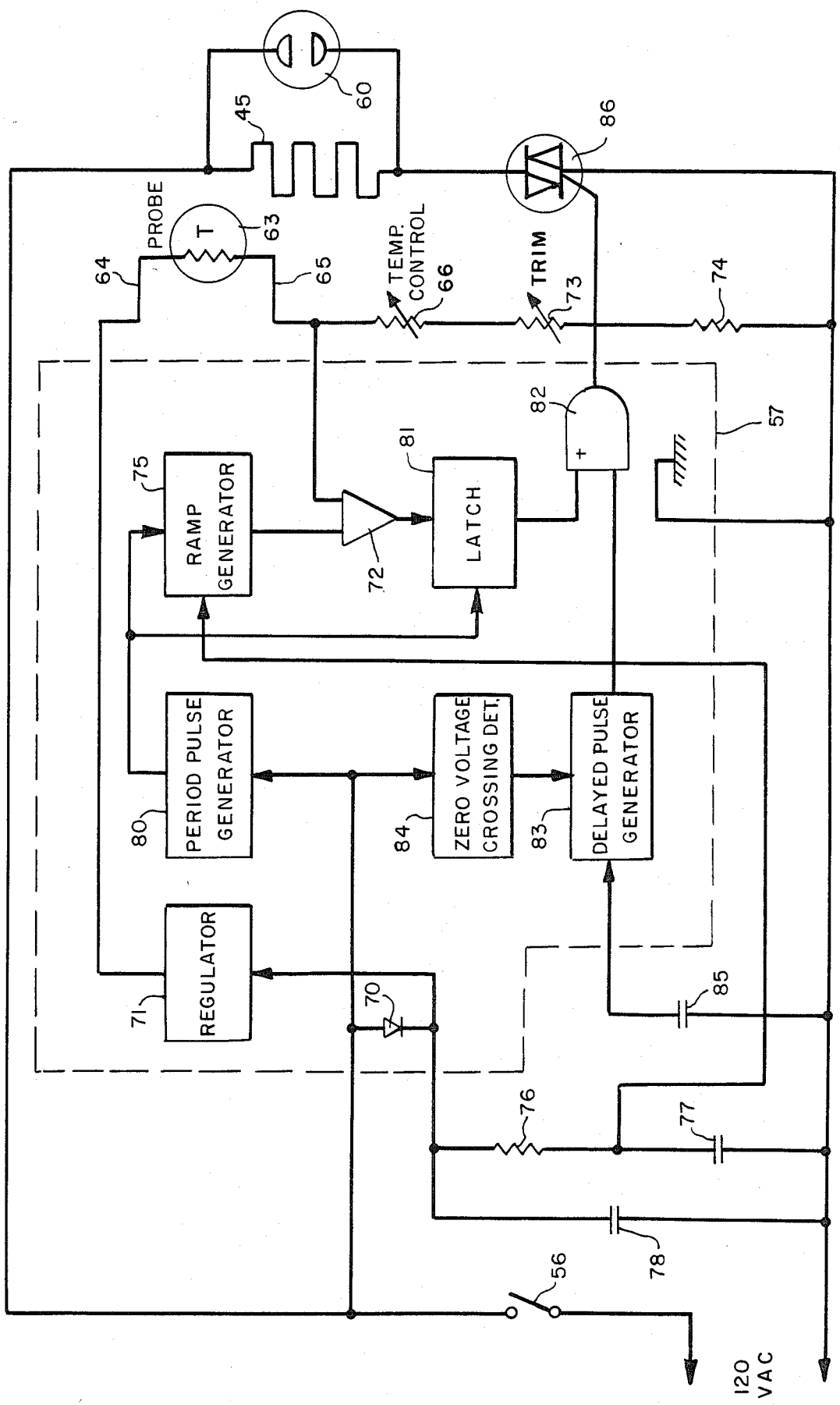
FIG. 5 is a simplified schematic diagram partially in functional block form of the resistance heater excitation control circuit of the coffee brewer.

Referring to FIG. 5, the control circuit 57 may advantageously be constructed as a zero voltage switch wherein the number of mains cycles applied to heating element 45 in a predetermined fixed timing period is varied as a function of the temperature sensed by thermistor 63. To this end, and with reference to FIG. 5, the alternating A/C mains current from power switch 56 is applied to a diode 70 which serves as a source of direct current for the control circuit. Direct current is applied to a regulator stage 71 which provides a constant voltage source for application over conductor 64 to thermistor 63. The other terminal of thermistor 63 is connected through conductor 65 to one input of a comparator amplifier 72, and to ground through the series combination of the temperature control potentiometer 66, a trim potentiometer 73 and a fixed resistor 74. With this arrangement, thermistor 63, temperature control potentiometer 66, trim potentiometer 73 and resistor 74 form a voltage divider, and the voltage applied to comparator amplifier 72 is a function of the temperature of thermistor 63. The other input of comparator amplifier 72 is connected to the output of a ramp generator 75, which functions to repetitively produce ramp signals of progressively increasing voltage and fixed D/C offset during fixed time intervals of a slope determined by a timing circuit comprising a resistor 76 and capacitor 77 connected between the output of diode 70 and system ground. A capacitor 78 connected between diode 70 and system ground filters the output of the diode to provide a filtered direct current for operation of the system.

Operation of ramp generator 75 is initiated at the beginning of each timing period by a period pulse generator 80 which functions in response to the applied alternating current to produce periodic pulses which initiate a periodic timing period T utilized in the operation of the system. These pulses are applied to ramp generator 75, wherein they initiate the generation of a ramp function signal, and to a latch circuit 81 which resets upon receipt of each pulse. The latch circuit 81 remains in the reset state until an output is applied from comparator 72 upon a comparison being made between the thermistor control signal and the ramp signal, at which time the latch actuates to a set state.

The output of latch 81 is supplied to one input of an AND gate 82. The remaining input of AND gate 82 received pulses from a delayed pulse generator 83. Pulse generator 83 is keyed by a zero voltage crossing detector 84, so as to produce an output pulse after a predetermined short delay following each zero crossing of the applied alternating current waveform. The degree of delay between the production of an output pulse by pulse generator 83 and the zero crossing of the applied alternating current waveform is determined by a timing capacitor 85 associated with pulse generator 83.

When AND gate 82 is enabled by latch 81, the delayed pulses produced by generator 83 at the beginning of each half cycle are applied to the gate electrode of a triac 86 having principal electrodes connected between resistance heating element 45 and the reference side of the A/C line. Thus connected, triac 86 responds to each of the applied pulses to conduct during the succeeding half cycle of the applied alternating current waveform, thereby energizing heating element 45 in a manner well known to the art.

Since AND gate 82 is enabled only in the event that a comparison has not been detected between the inputs of comparator amplifier 72, the duty cycle of heating element 45 is dependent on the temperature sensed by thermistor 63. When the temperature of the water in reservoir 32 is less than the predetermined desired serving temperature, as when the water is being initially heated, the voltage division effected by resistors 66, 73 and 74 in combination with thermistor 63 does not reach the offset level of the ramp signal and heating element 45 is continuously excited. However, once the operating temperature has been attained, and the voltage applied to comparator amplifier 72 becomes equal to that applied by ramp generator 75 at some point during a timing period, latch 81 switches to a set state, gate 82 is inhibited, and gating pulses are not applied to triac 86. As a result, heating element 45 is not energized for the duration of the timing period. Upon initiation of the succeeding timing period, latch 81 is again conditioned to a reset state and comparator amplifier 72 does not condition a set state until a comparison is again made, at which time the application of half-cycle gating pulses to triac 86 is again terminated for the balance of the succeeding timing period.

The timing period T is sufficiently long so that multiple cycles of the applied A/C mains current are available to the heating element during any one timing period. Thus, during each timing period heating element 45 is energized for a number of complete half-cycles dependent on the temperature of the water. If the water is cooler than desired, a greater number of half-cycles is applied. If the water is hotter than desired, a lesser number of half-cycles is applied.

The mode of operation of coffee brewer 10 is further illustrated by the waveforms of FIGS. 6 and 7. As shown in FIG. 6, upon initial power-up of coffee brewer 10, the temperature of the water in reservoir 32, as illustrated by plot 90, rises with time until the preselected serving temperature $T_{nom}$ is reached, at which time the temperature rise levels off. This is in contrast to prior art thermostats wherein the temperature fluctuated between a maximum temperature $T_{max}$ and a minimum temperature $T_{min}$, as shown by the plot 91.

The manner in which the leveling off of the temperature is achieved is illustrated in FIG. 7, wherein the voltage at comparator 72 as applied by thermistor 63 is plotted against time in conjunction with the ramp function applied to the comparator by ramp generator 75. If the ramp function is taken as varying between an initial offset voltage $V_0$ and a final voltage $V_f$, it is seen that the voltage $V_t$ from thermistor 63 eventually rises, as depicted by plot 92, to a level greater than $V_0$. Up to that point, the excitation applied to heating element 45 is continuous and maximum heating of the water in reservoir 32 is achieved. However, upon the thermistor voltage exceeding $V_0$, the excitation applied to the heating element is reduced in proportion to the extent that the voltage $V_t$ exceeds $V_0$, thereby causing the temperature of the water in the reservoir to stabilize at some selected temperature which will provide a voltage $V_t$ intermediate the minimum and maximum voltages $V_0$ and $V_f$ of the ramp function.

This is illustrated in greater detail in FIG. 8. Here, the thermistor output voltage $V_t$ is seen to be situated at a voltage level approximately intermediate the minimum and maximum voltage levels of the ramp function 93, such that the voltage comparison is achieved at a location generally intermediate the timing period T established by period pulse generator 80. The ramp function 93 is seen to have a repetition rate identical to the timing period T. The thermistor output voltage plot 94 is seen to lie intermediate the high and low voltage limits of the ramp function, a voltage crossing point 95 being established within the timing period T.

Upon initiation of each timing period T, the period pulse generator 80 produces a period pulse, as shown by waveform 96. This timing pulse initiates the formation of a ramp function by ramp generator 75 and conditions latch 81 to a set state. Consequently, AND gate 82 is enabled and keying pulses developed by pulse generator 83 following each zero crossing of the applied alternating current line voltage detected by crossing detector 84 are applied to the gate electrode of triac 86. These firing pulses, as depicted by waveform 97, continue until a comparison is achieved between the ramp function 93 and the thermistor voltage 94, at which time latch 81 is conditioned to a reset state, AND gate 82 is inhibited, and triac 86 becomes nonconductive. Consequently, the alternating current applied to heating element 45, as depicted by waveform 98, is interrupted for the remaining portion of the timing cycle T, shown as $T_{off}$.

It will be noted that only complete half-cycles of the applied A/C mains current, as depicted by waveform 99, are applied to heating element 45 while triac 86 is conductive. This minimizes the electrical interference often associated with switching resistance heating devices during periods of current flow, as when using bimetallic-type thermostat switches, and avoids introducing a D/C component into the A/C mains supply from uneven half-cycle current demands.

Should the temperature of the water in reservoir 32 increase, a comparison is achieved earlier between the ramp function 93 and the increased voltage of the thermistor, as depicted by waveform 94a, resulting in a crossing point 95a earlier in the timing period. Consequently, the heating element 45 will be energized for a lesser portion of the timing cycle, tending to cool the water within the reservoir. Conversely, should the temperature of the water fall, resulting in a reduced voltage $V_t$, as depicted by waveform 94b, then the comparison with the ramp function 93 will occur at a point 95b later in the timing cycle, resulting in the heating element 45 being energized for a greater portion of the timing cycle, thereby tending to raise the temperature of the water with the reservoir.

In a commercial version of the coffee brewer having the capacity and dimensions previously described and operable from 120 VAC 60 cycle current, the timing period T may be 2.0 seconds, and the brewer may be operable over a temperature range of 165° F. to 210° F., depending on the setting of potentiometer 66.

The components contained within the dotted enclosure 87 may be conveniently incorporated within a single integrated circuit. One such integrated circuit which has proven successful in this application is the Model SL441A Zero Voltage Switch manufactured by Plessey Semiconductors. Other integrated circuits, such as the Motorola Model UAA1016 may be utilized instead.

Thus, the function of control circuit 57 is to maintain the water within reservoir 32 at a predetermined brewing temperature for brewing intermediate maximum and minimum temperatures corresponding to maximum and minimum voltages developed by the ramp generator 75. Should the temperature fall below this temperature range, as during initial power-up or following the brewing of a large quantity of beverage, the heating element will be continuously energized during the entire duration of each timing period and the water temperature will be raised as quickly as possible to the selected nominal serving temperature.

Control circuit 57 (FIG. 4) provides continuous control of the excitation applied to heating element 45, resulting in significantly improved control of water temperature within the water reservoir 32. This obviates the need for auxiliary heating elements, such as resistance heating blankets utilized in conjunction with prior art thermostat devices, and assists in reducing scaling by subjecting the heating element to continuous short-term cycling within each timing period.

Although the invention has been shown in conjunction with a pour-in type beverage brewer, it will be appreciated that the invention can be practiced in other beverage brewers having heated water reservoirs, including automatic-filling brewers wherein cold water is admitted to the reservoir through a valve, which may be actuated by means of a timing circuit or other known type of measuring system.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. A beverage brewing apparatus comprising:
a hot water reservoir of predetermined volume;
means including a resistance heating element within said reservoir operable from an applied electric current for heating water in the reservoir;
inlet means for admitting a volume of cold water equal to a predetermined serving volume into an inlet zone at the bottom of said reservoir;
outlet means for discharging a volume of heated water equal to said predetermined serving volume from an outlet zone at the top of said reservoir coincident with the introduction of water by said inlet means into said reservoir;
said reservoir having a volume substantially greater than twice said predetermined serving volume whereby a volume of resident heated water is contained within a central brew zone thereof;
a segment of hollow heat-conductive tubing extending from a location at one end exterior to the reservoir to a predetermined location in said brew zone of said reservoir;
temperature sensing means disposed within the lumen of said tubing segment in thermal communication with said tubing segment at said predetermined location for producing a temperature control signal continuously indicative only of the temperature of the water at said predetermined location in said brew zone, and substantially non-indicative to the temperature of said water in said inlet and outlet zones; and
control circuit means responsive to said control signal for varying the duty cycle of the heating element over recurring timing intervals to maintain said water in said brew zone at a substantially constant predetermined temperature.

2. A beverage brewing apparatus as defined in claim 1 wherein said inlet zone corresponds to approximately the bottom ¼ volume of said reservoir, and said outlet zone corresponds to approximately the top ¼ volume of said reservoir.

3. A beverage brewing apparatus as defined in claim 1 wherein said inlet means include a tube extending vertically in said reservoir for conveying cold water to said inlet zone.

4. A beverage brewing apparatus as defined in claim 1 wherein said temperature sensing means comprise a thermistor.

* * * * *